(12) United States Patent
Bryan et al.

(10) Patent No.: US 7,189,270 B2
(45) Date of Patent: Mar. 13, 2007

(54) METHOD AND APPARATUS FOR GASIFICATION-BASED POWER GENERATION

(75) Inventors: Bruce Bryan, Wilmette, IL (US); Iosif Rabovitser, Skokie, IL (US)

(73) Assignee: Gas Technology Institute, Des Plaines, IL (US)

( * ) Notice: Subject to any disclaimer, the term of this patent is extended or adjusted under 35 U.S.C. 154(b) by 828 days.

(21) Appl. No.: 10/013,224

(22) Filed: Dec. 10, 2001

(65) Prior Publication Data
US 2003/0106266 A1 Jun. 12, 2003

(51) Int. Cl.
*B01J 3/00* (2006.01)

(52) U.S. Cl. .......................... 48/197 R; 48/61; 48/62; 48/89; 48/102; 48/127.9; 48/198.1; 48/211; 422/188; 422/198; 422/199; 422/200; 422/211; 422/222

(58) Field of Classification Search ................ 422/111, 422/139–147, 188–196, 198–206; 48/197–210; 201/12, 31–36; 431/121–138; 60/650, 682; 122/248–250; 110/165–186, 229–348; 423/650–659; 432/121–138; 252/373–376; 518/703–705
See application file for complete search history.

(56) References Cited

U.S. PATENT DOCUMENTS

| 4,057,402 A | 11/1977 | Patel et al. ............. 48/197 R |
| 4,069,024 A * | 1/1978 | Fernandes .............. 48/197 R |
| 4,213,752 A * | 7/1980 | Seitzer ..................... 432/14 |
| 4,315,758 A * | 2/1982 | Patel et al. ............. 48/197 R |
| 4,592,762 A | 6/1986 | Babu et al. ............. 48/197 R |
| 4,602,573 A * | 7/1986 | Tanca ....................... 110/342 |
| 4,699,632 A | 10/1987 | Babu et al. ............. 48/197 R |
| 5,205,227 A | 4/1993 | Khinkis et al. ........... 110/345 |
| 5,638,773 A * | 6/1997 | Brady et al. ............. 122/248 |
| 5,720,165 A * | 2/1998 | Rizzie et al. ............ 60/39.464 |
| 5,937,772 A | 8/1999 | Khinkis et al. ........... 110/345 |
| 6,035,644 A * | 3/2000 | LaHaye et al. ............ 60/683 |
| 2002/0166484 A1* | 11/2002 | Zamansky et al. ......... 110/342 |

OTHER PUBLICATIONS

Manjunath et al., Efficient and Clean Biomass Gasification and Combustion Technology for Bagasse, www.fwc.com/publications/tech_papers/powgen/bagasse3.cfm, Aug. 23, 2000.*

(Continued)

*Primary Examiner*—Glenn Caldarola
*Assistant Examiner*—Vinit H Patel
(74) *Attorney, Agent, or Firm*—Mark E. Fejer (57) ABSTRACT

A method and apparatus for conversion of solid and liquid fuels to a synthesis gas, steam and/or electricity in which about 10% to about 40% of a solid fuel and/or a liquid fuel is introduced into a gasifier and gasified, resulting in formation of a synthesis gas. The remaining portion of the solid fuel and/or liquid fuel is introduced into a first stage of a multi-stage combustor, resulting in formation of products of combustion and ash and/or char. The synthesis gas is introduced into a second stage of the multi-stage combustor disposed downstream of the first stage and overfire oxidant is introduced into a third stage of the multi-stage combustor disposed downstream of the second stage. The ash and/or char from the multi-stage combustor is then recycled into the gasifier.

13 Claims, 10 Drawing Sheets

OTHER PUBLICATIONS

Topical Report No. 14, Clean Coal Technology (May 1999).*
Toupin, K., "Ash Volume Reduction and Boiler Efficiency Improvement by Ash Reburning", *TAPPI Proceedings—1992 Engineering Conference*, pp. 1181-1193, (1992).

Weber, G.F. et al., "Testing of a Very High-Temperature Heat Exchanger in a Pilot-Scale Furnace System", American Society of Mechanical Engineers, pp. 1-8, (2000).

* cited by examiner

METHOD AND APPARATUS FOR GASIFICATION-BASED POWER GENERATION

FIELD OF THE INVENTION

This invention relates to a method and apparatus for combined heat and power or electric power generation applications. More particularly, this invention relates to an integrated gasification and combustion system for solid- or liquid-fueled combined heat and power or electric power generation. Although suitable for use with conventional solid and liquid fuels, the method and apparatus of this invention are also suitable for use with difficult to burn renewable fuels, such as biomass.

BACKGROUND OF THE INVENTION

Methods and devices for gasification of solid and/or liquid fuels, including renewable fuels such as biomass are well known to those skilled in the art. See, for example, U.S. Pat. No. 4,699,632 to Babu et al. which teaches a process for gasification of cellulosic materials in a single gasification vessel in which the cellulosic materials are introduced directly into a single back-mixed fluidized bed of high heat capacity inert solids and U.S. Pat. No. 4,315,758 to Patel et al. which teaches the gasification of solid fuels to produce medium-Btu fuel gas or synthesis gas. Gasification of solid and/or liquid fuels is employed as a means for producing a gaseous fuel that will be substantially cleaner burning than direct combustion of the solid and/or liquid fuel. However, the synthesis gas produced by the gasification of solid and/or liquid fuels, in addition to being hot, also contains a significant amount of undesirable elements which must be removed prior to combustion of the synthesis Methods and devices for the combustion of solid and/or liquid fuels such as pulverized coal, refused derived fuel, municipal solids waste and biomass are also well known to those skilled in the art. Such devices include stokers, fluid-bed combustors, pressurized fluid-bed combustors and pulverized coal combustors. See, for example, U.S. Pat. No. 5,205,227 to Khinkis et al. which teaches a process and apparatus for combustion of waste materials such as municipal solid waste, refuse derived fuel or other comparable solid waste in a stoker-type furnace. These methods and devices are typically employed in combination with industrial utility boilers for generating steam, which, in turn, may be used as process steam or in steam turbines for the generation of electricity. One problem with these methods and devices is the requirement for disposal of the significant amount of flyash and bottom ash generated. One partial solution to this problem is taught by U.S. Pat. No. 5,937,772 to Khinkis et al. in which flyash is recycled back to the combustion chamber for the recovery and further combustion of carbon present in the flyash. Another problem with these methods and devices is the frequent requirement for pre-drying of the fuel before introduction into the combustor, particularly with respect to renewable fuels such as biomass. Yet another problem with conventional systems is their intolerance of low heating value and variable heating value fuels which affects the ability of such systems to operate on a consistent basis, thereby compromising their capacity, efficiency, emissions and reliability.

SUMMARY OF THE INVENTION

It is one object of this invention to provide a method and apparatus for conversion of solid and/or liquid fuels to heat and/or electricity which provides increased energy conversion efficiency (fuel to usable heat and/or fuel to electricity) over conventional energy conversion processes.

It is another object of this invention to provide a method and apparatus for conversion of renewable fuels, such as biomass, which addresses the difficulties associated with combustion of such fuels.

It is another object of this invention to provide a method and apparatus for conversion of solid and/or liquid fuels which is suitable for handling fuels of low heating value as well as fuels of variable heating value.

It is yet another object of this invention to provide a method and apparatus for conversion of solid and/or liquid fuels which addresses the issue of carbon utilization and reduced ash disposal of ash generated by conventional systems.

It is yet another object of this invention to provide a method and apparatus for conversion of solid and/or liquid fuels which produces reduced amounts of emissions compared to conventional systems and methods.

These and other objects of this invention are addressed by a method and apparatus for conversion of solid and/or liquid fuels to a synthesis gas, steam and/or electricity in which in the range of about 10% to about 40% of a total amount of solid and/or liquid fuel is gasified, resulting in formation of a synthesis gas, also referred to herein as "syngas". The remaining portion of the solid fuel and/or liquid fuel is introduced into the first stage of a multi-stage combustor, resulting in formation of products of combustion and ash and/or char. The synthesis gas from the gasifier is introduced into a second stage of the multi-stage combustor, which second stage is disposed downstream of the first stage, and overfire oxidant is introduced into a third stage of the multi-stage combustor disposed downstream of the second stage. Ash and/or char generated in the multi-stage combustor is recycled back to the gasifier, providing increased carbon burnout from the combustor ash and/or char stream.

The apparatus of this invention comprises a gasifier having a syngas outlet, a multi-stage combustor suitable for combusting a solid fuel and/or a liquid fuel and having at least one syngas inlet in fluid communication with the syngas outlet adapted to introduce syngas into a second stage of the multi-stage combustor and at least one overfire oxidant inlet adapted to introduce an overfire oxidant into a third stage of the multi-stage combustor disposed downstream of the second stage. Ash recycle means are provided for recycling ash and/or char from the multi-stage combustor into the gasifier.

BRIEF DESCRIPTION OF THE DRAWINGS

These and other objects and features of this invention will be better understood from the following detailed description taken in conjunction with the drawings wherein.

DETAILED DESCRIPTION OF PRESENTLY PREFERRED EMBODIMENTS

The invention disclosed and claimed herein is an integrated gasification and combustion system and method for solid- and/or liquid-fueled combined heat and power or electric generation applications that increases energy conversion efficiency, by which we mean the ratio of fuel energy to usable heat and/or fuel to electricity, reduces emissions of $NO_X$ and $CO_2$, and improves combustion performance including combustion stability, load following, carbon burnout and tolerance of low heating value and variable heating value fuels. The method and apparatus are applicable to the conversion of solid and liquid fuels to fuel gas, steam and electricity. The invention integrates a gasifier with a conventional stoker combustor, fluid-bed combustor, pressurized fluid-bed combustor, or pulverized coal combustor, into which combustors a solid fuel in the amount of about 60% to about 90% of the total amount of fuel to the system is introduced and combusted, forming a primary combustion zone.

Figure 1:
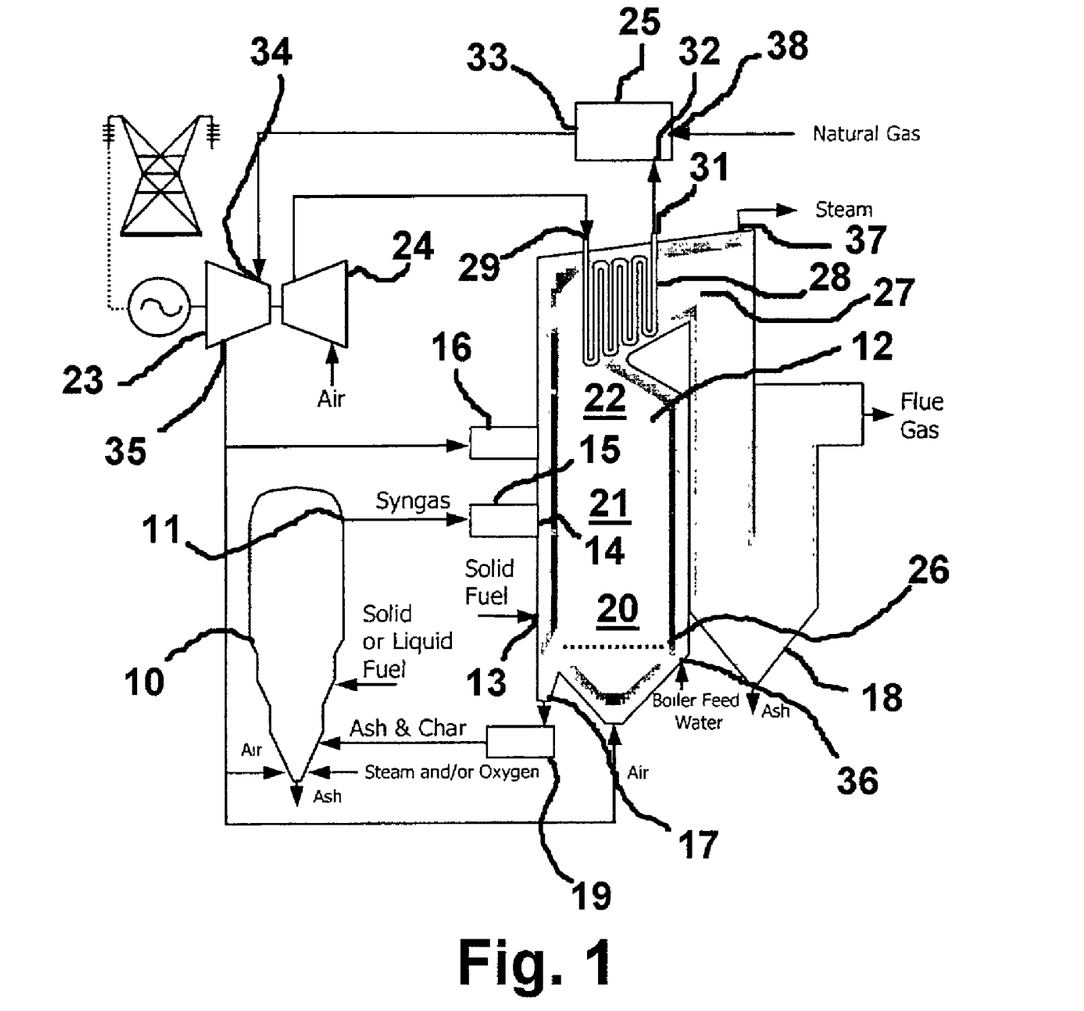
FIG. 1 is a schematic diagram of an integrated gasification and combustion system for solid- or liquid-fueled combined heat and power generation applications in accordance with one embodiment of this invention.
Figure 2:
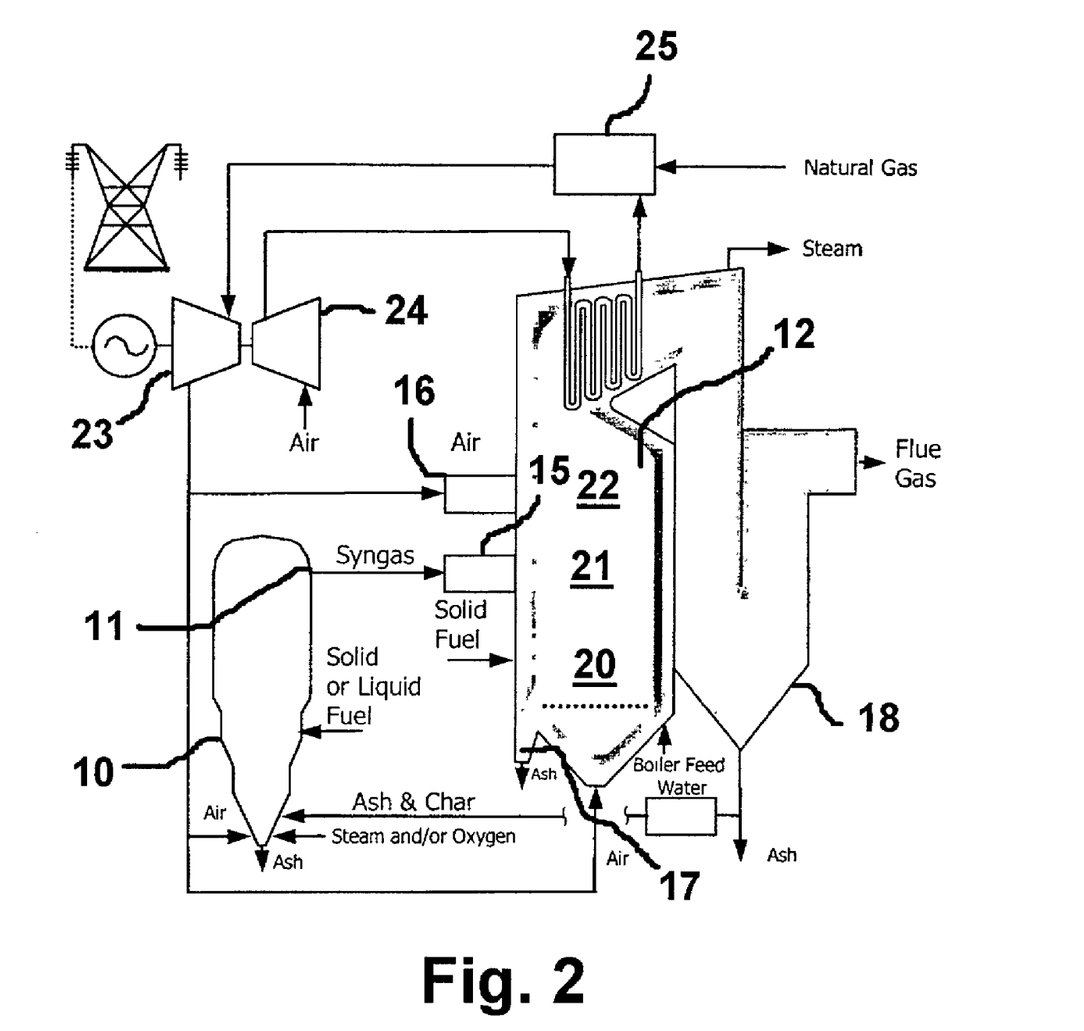
FIG. 2 is a schematic diagram of an integrated gasification and combustion system for solid- or liquid-fueled combined heat and power generation applications in accordance with another embodiment of this invention.

As shown in FIGS. 1 and 2, the apparatus (system) of this invention comprises gasifier 10 having a syngas outlet 11, a multi-stage combustor 12 comprising at least one combustor wall 26 having at least one solid fuel and/or liquid fuel inlet 13, at least one syngas inlet 14 in fluid communication with syngas outlet 11 of gasifier 10 and forming a flue gas outlet 27. Typical of gasifiers suitable for use in the apparatus of this invention are taught by U.S. Pat. Nos. 4,699,632 and 4,315,758, both of which are incorporated herein by reference in their entirety. Although there are a variety of combustors suitable for use in the apparatus of this invention, for exemplary purposes, in the embodiment shown in FIG. 1, combustor 12 is a stoker boiler having a boiler feed water inlet 36 and a steam outlet 37. The apparatus of this invention further comprises a flue gas cleaning system 18 which is in fluid communication with flue gas outlet 27 of combustor 12 in which particulates, such as flyash, which may be present in the flue gas from combustor 12 are removed.

Figure 3:
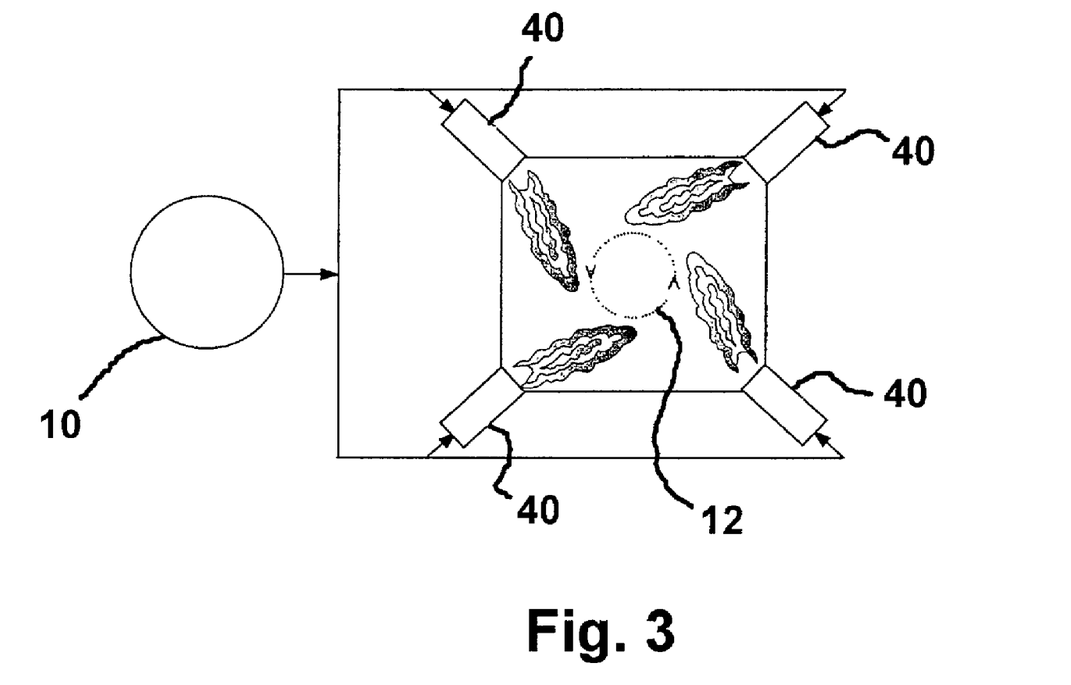
FIG. 3 is a plan view of a syngas injection system with tangential injector alignment for a multi-stage combustor in accordance with one embodiment of this invention.
Figure 4:
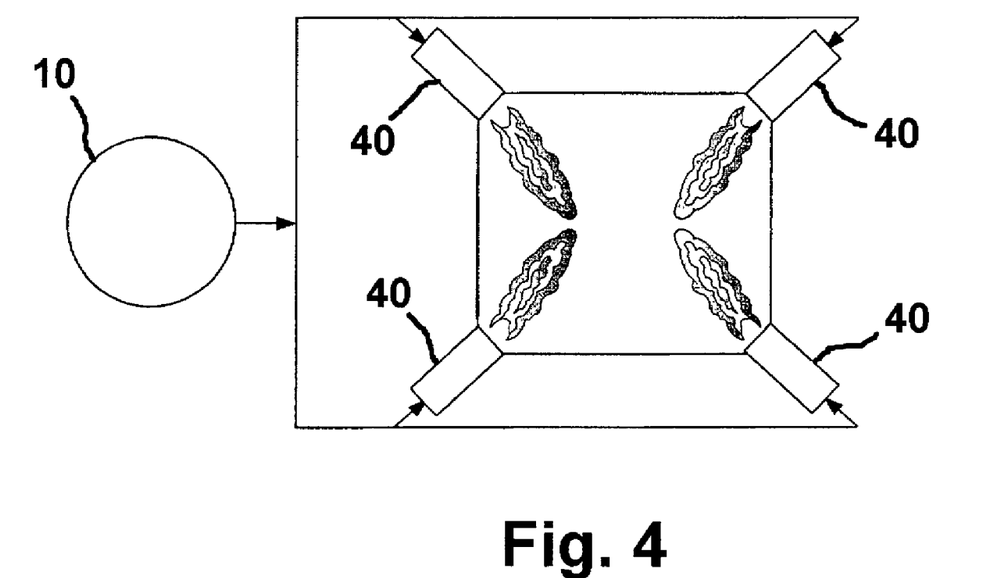
FIG. 4 is a plan view of a syngas injection system with impinging injector alignment for a multi-stage combustor in accordance with one embodiment of this invention.
Figure 5:
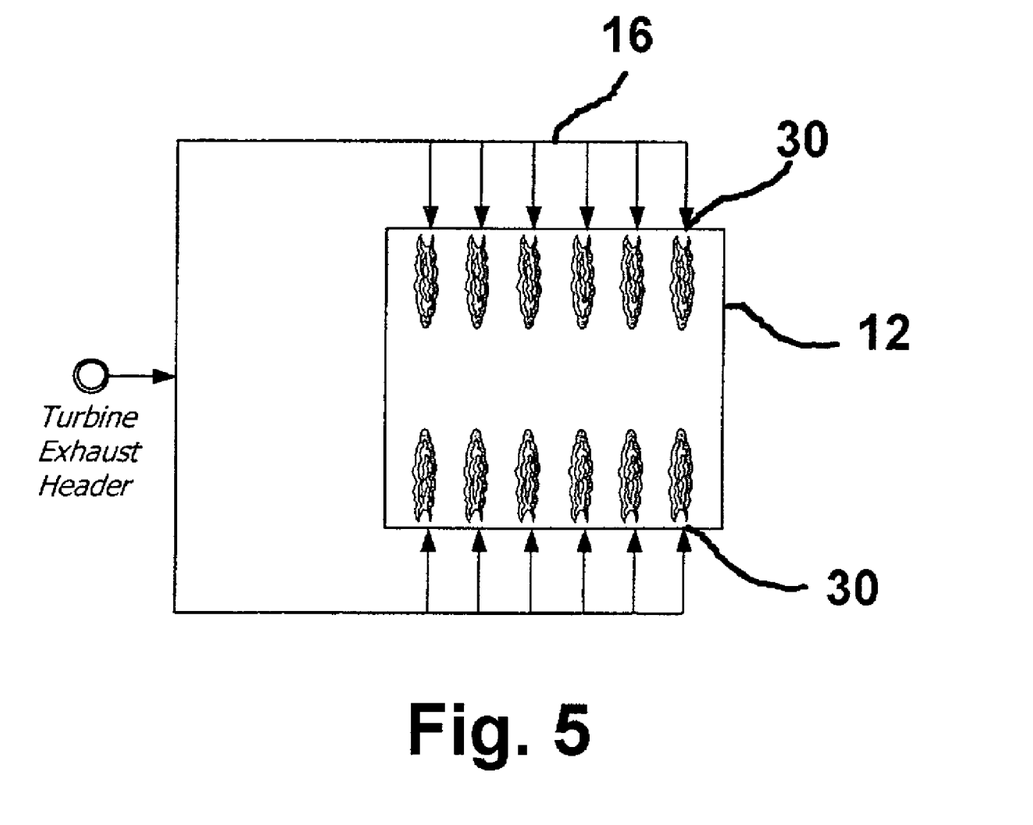
FIG. 5 is a plan view of an overfire air system for a multi-stage combustor in accordance with one embodiment of this invention.

Gasifier 10 is used to generate a synthesis gas through the partial oxidation of solid and/or liquid fuels at temperatures of about 1200° F. to about 2000° F. and pressures up to about 30 atmospheres. The gasifier pressure is maintained from about 0.05 to about 1.5 atmospheres above the operating pressure of multi-stage combustor 12. From about 10% to about 40% of the total fuel input for the system is fed to the gasifier 10 in which it is partially oxidized by a mixture of air, steam and/or oxygen to produce a mixture of combustible gases, referred to herein as "synthesis gas" or "syngas", including CO, $CO_2$, $H_2$, $CH_4$, $N_2$, and $H_2O$ and some higher hydrocarbon species in the form of vaporized tars and oils. The air- or oxygen-to-fuel ratio in the gasifier is maintained from about 0.25 to about 0.60 depending on the gasification temperature in the fluid bed. The hot syngas is conveyed directly from gasifier 10 through syngas outlet 11 and syngas inlet 14 into multi-stage combustor 12, without cooling or cleaning. The syngas is introduced into combustor 12 through syngas injection system 15 as a reburn fuel downstream of a first stage or primary combustion zone 20 disposed within combustor 12 and formed by the combustion of a liquid and/or solid fuel, forming a second stage or reburn zone 21 which is a reducing zone that destroys $NO_X$ precursors and significantly reduces $NO_X$ formation in combustor 12. In accordance with one embodiment of this invention as shown in FIG. 3, syngas injection system 15 comprises a plurality of syngas injectors 40 having a tangential alignment resulting in tangential injection of the syngas. In accordance with another embodiment of this invention as shown in FIG. 4, syngas injectors 40 have an impinging alignment whereby the syngas introduced by one syngas injector impinges upon the stream of syngas introduced by another of the syngas injectors. The added gas flow also increases both heat release and gas mixing proximate the primary combustion zone 20. This, combined with the presence of hydrogen, $H_2$, in the reburn syngas improves combustion stability and the ability to maintain combustor load through periods of increased moisture in the solid or liquid fuel and/or reduced fuel heating value. Final burnout is completed in a third stage or tertiary combustion zone 22, formed by the introduction of overfire oxidant equal to about 30% to about 50% by volume of the total amount of combustion oxidant introduced into combustor 12 and disposed downstream of reburn zone 21, through overfire oxidant or air system 16. A preferred overfire oxidant system injector arrangement in accordance with one embodiment of this invention, as shown in FIG. 5, comprises a plurality of opposed oxidant injectors 30.

In accordance with one particularly preferred embodiment of this invention, depending upon the fuels utilized in gasifier 10 and combustor 12, at least a portion of the bottom ash 17 from combustor 12 and/or flyash from the flue gas cleaning system 18 are size-classified and transported to gasifier 10 by means of ash recycle system 19 for use as a fluidized bed media, thereby providing increased carbon burnout from the combustor ash streams. Likewise, unconverted carbon carried over in the gasifier syngas undergoes further conversion as it passes through virtually the full height of the combustor 12. Combustor efficiency is therefore increased through increased carbon utilization from the fuels.

In accordance with one embodiment of the system of this invention, a gas turbine generator system 23 is used for power generation in the system, with pressurized, heated air as the working fluid as a result of which power generation efficiencies more than 50% higher than conventional steam turbine systems are achieved. Ambient air from turbine compressor 24 is heated to about 1200° F. to about 2000° F. in a high temperature air heat exchanger 28 in combustor 12 between overfire air system 16 and flue gas outlet 27 and having an ambient temperature compressed air inlet 29 and a heated compressed air outlet 31 where the steam superheater bank of a boiler is normally located. Indirect heating of the gas turbine working fluid eliminates the need for hot gas cleaning typical of other integrated gasification-based power generation systems to meet stringent turbine gas quality requirements. The integrated gasification-based power generation system of this invention also improves combustion stability and temperature uniformity in the furnace to minimize thermal cycling and hot spots which may accelerate failure of the high temperature air heater tubes. Turbine combustor 25 having a preheated compressed air inlet 32 in fluid communication with heated compressed air outlet 31 of heat exchanger 28, a gaseous fuel inlet 38 and a high temperature air outlet 33 is fired in a high excess air mode with a small amount of natural gas to raise the air temperature to about 2100° F. to about 2600° F., thereby further increasing system efficiency. The integrated gasification-based power generation system of this invention further comprises gas turbine 23 having high temperature air inlet 34 in fluid communication with high temperature outlet 33 of turbine combustor 25 and gas turbine exhaust air outlet 35. Exhaust air from gas turbine 23, at about 700° F., may be used as combustion air and/or overfire air in combustor 12 as well as air feed to gasifier 10. In accordance with one embodiment of this invention, the steam generator banks of the stoker boiler are left in place for steam cogeneration. In accordance with another embodiment of this invention, the steam generator banks are replaced with additional air heater surface to maximize electric power generation. In this maximum electricity case, the additional heated exhaust air from gas turbine 23 can be efficiently utilized for drying wet fuels such as biomass, as shown in FIG. 6, and/or for process steam generation, as shown in FIG. 7.

Figure 6:
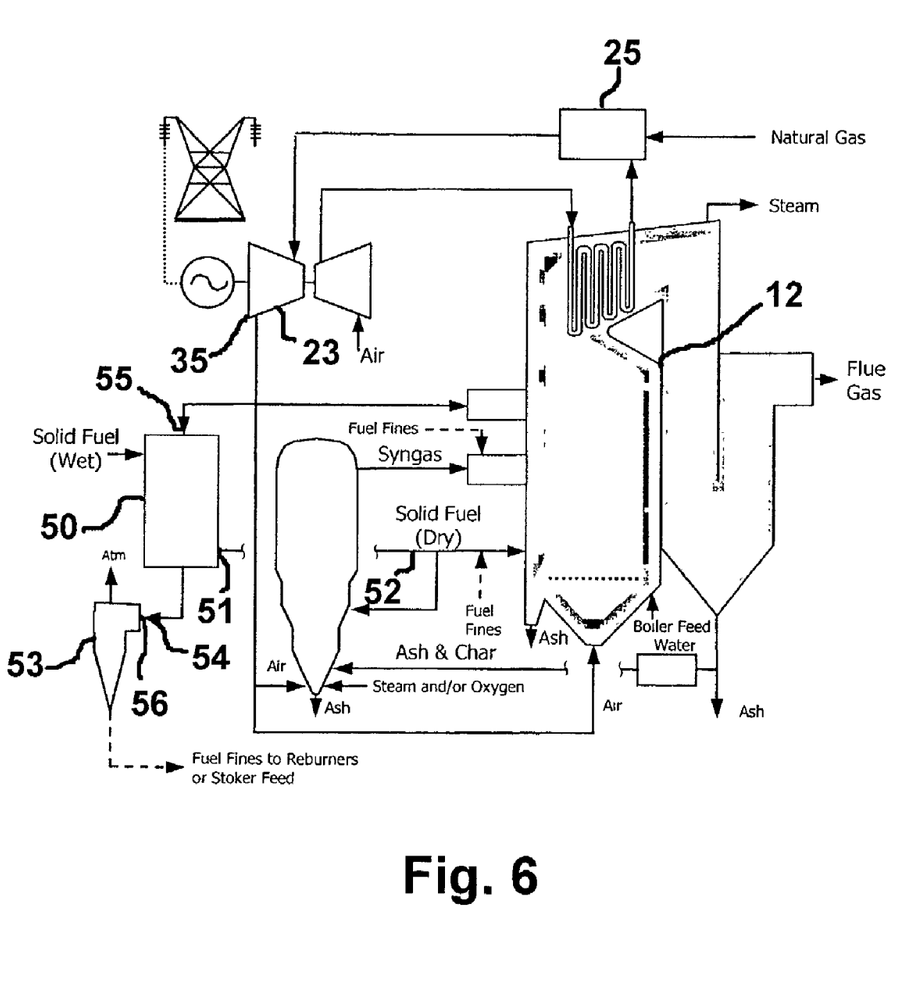
FIG. 6 is a schematic diagram of a gasification-based combined heat and power generation system with fuel dryer in accordance with one embodiment of this invention.

As shown in FIG. 6, in accordance with one embodiment of this invention, the gasification-based power generation system further comprises solid fuel dryer 50 having a heated exhaust air inlet 55 in fluid communication with gas turbine exhaust air outlet 35 of gas turbine 23 and a dry fuel outlet 51 through which dry solid fuel is introduced by means of line 52 into combustor 12. To collect fuel dust generated in fuel dryer 50, the system further comprises fuel dryer dust collector 53 to having a fuel dust inlet 56 in fluid communication with fuel dryer 50 through which fuel dust from fuel dryer 50 is received through line 54. The collected fuel dust may then be recycled to combustor 12 as part of the primary fuel or it may be introduced into combustor 12 through syngas injectors 15 as a reburn fuel.

Figure 7:
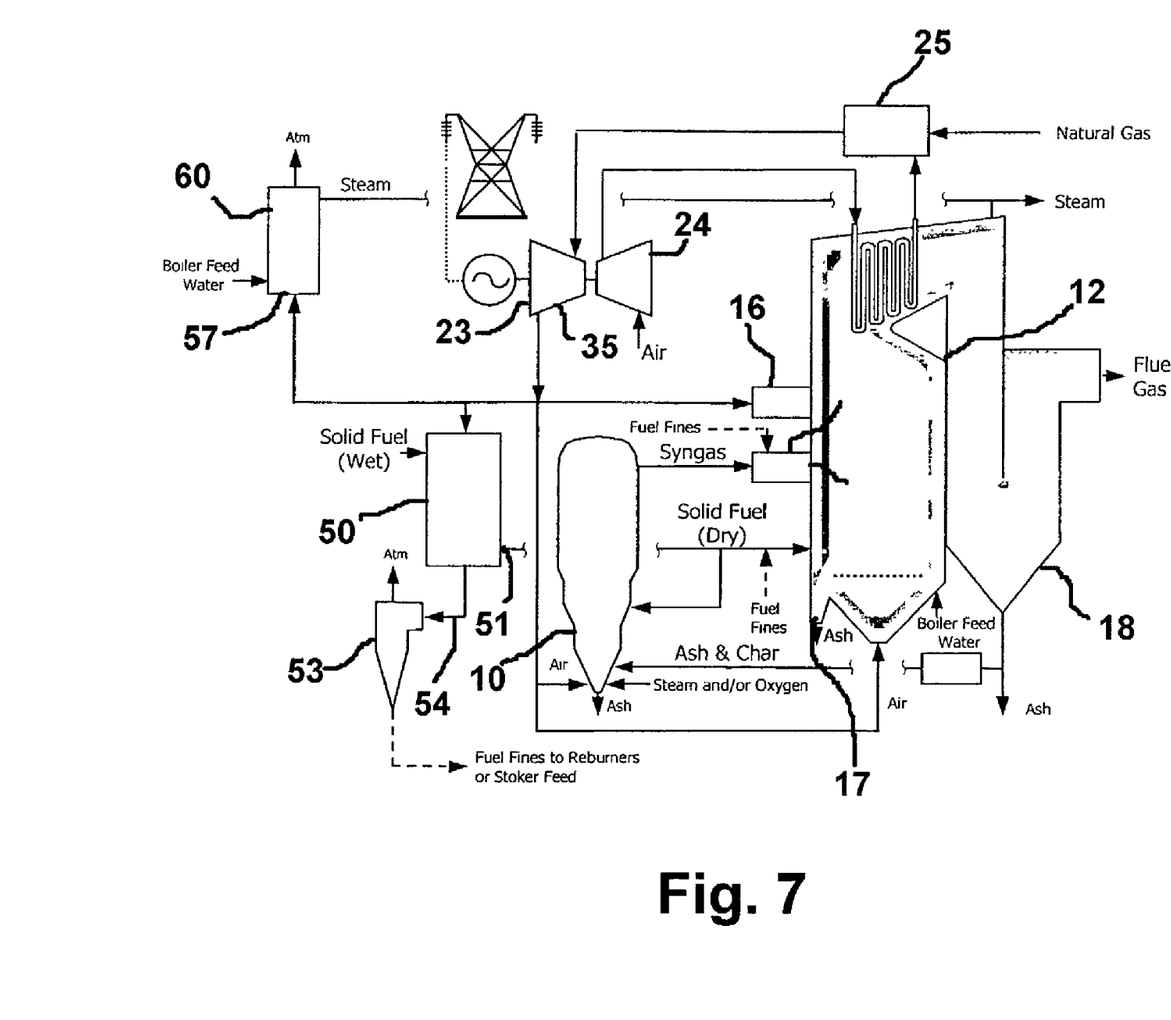
FIG. 7 is a schematic diagram of a gasification-based combined heat and power generation system having a fuel dryer and heat recovery steam generator in accordance with one embodiment of this invention.

In accordance with one embodiment of this invention as shown in FIG. 7, the gasification-based power generation system of this invention comprises a heat recovery steam generator 60 for generation of process steam having a gas turbine exhaust air inlet 57 in fluid communication with gas turbine exhaust air outlet 35. In this case, the additional heated exhaust air from gas turbine 23 is used not only to dry solid fuel, but also to raise steam in the heat recovery steam generator 60.

Figure 8:
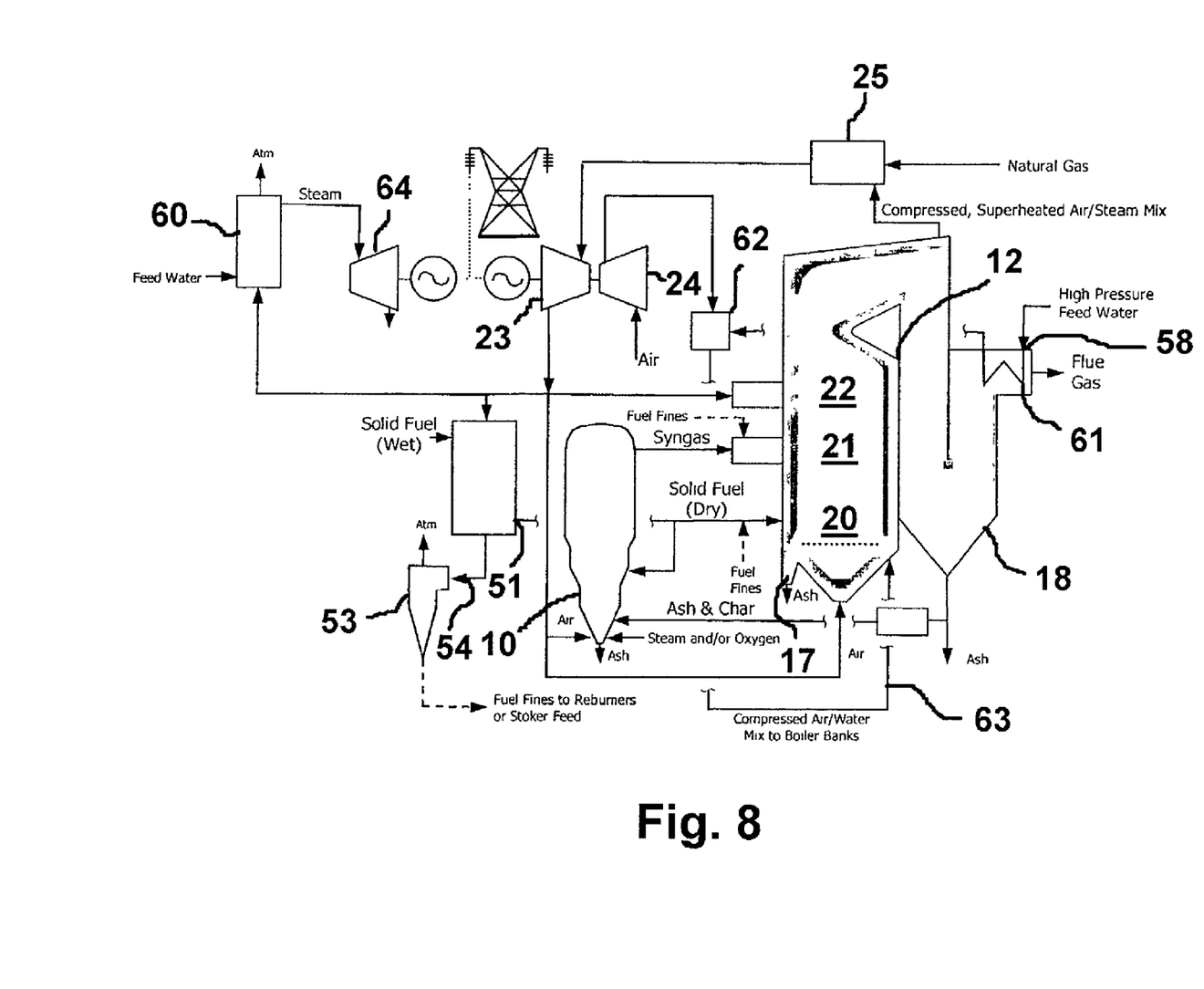
FIG. 8 is a schematic diagram of a gasification-based electricity generation system having a combined air/steam working fluid in accordance with one embodiment of this invention.

In accordance with one embodiment as shown in FIG. 8, the system of this invention further comprises economizer 61 having a high pressure boiler feed water inlet 58 in which boiler feed water is preheated and water injection system 62. The preheated boiler feed water from economizer 61 is mixed with air in water injection system 62. The compressed air/water mixture from water injection system 62 is then introduced through line 63 into combustor 12 to produce a superheated air/steam mixture which, in turn, is introduced into turbine combustor 25 through preheated air inlet 32, which is then used as the working fluid in gas turbine 23. In this case, steam raised in the heat recovery steam generator 60 is used for additional power generation through a steam turbine bottoming cycle 64.

Figure 9:
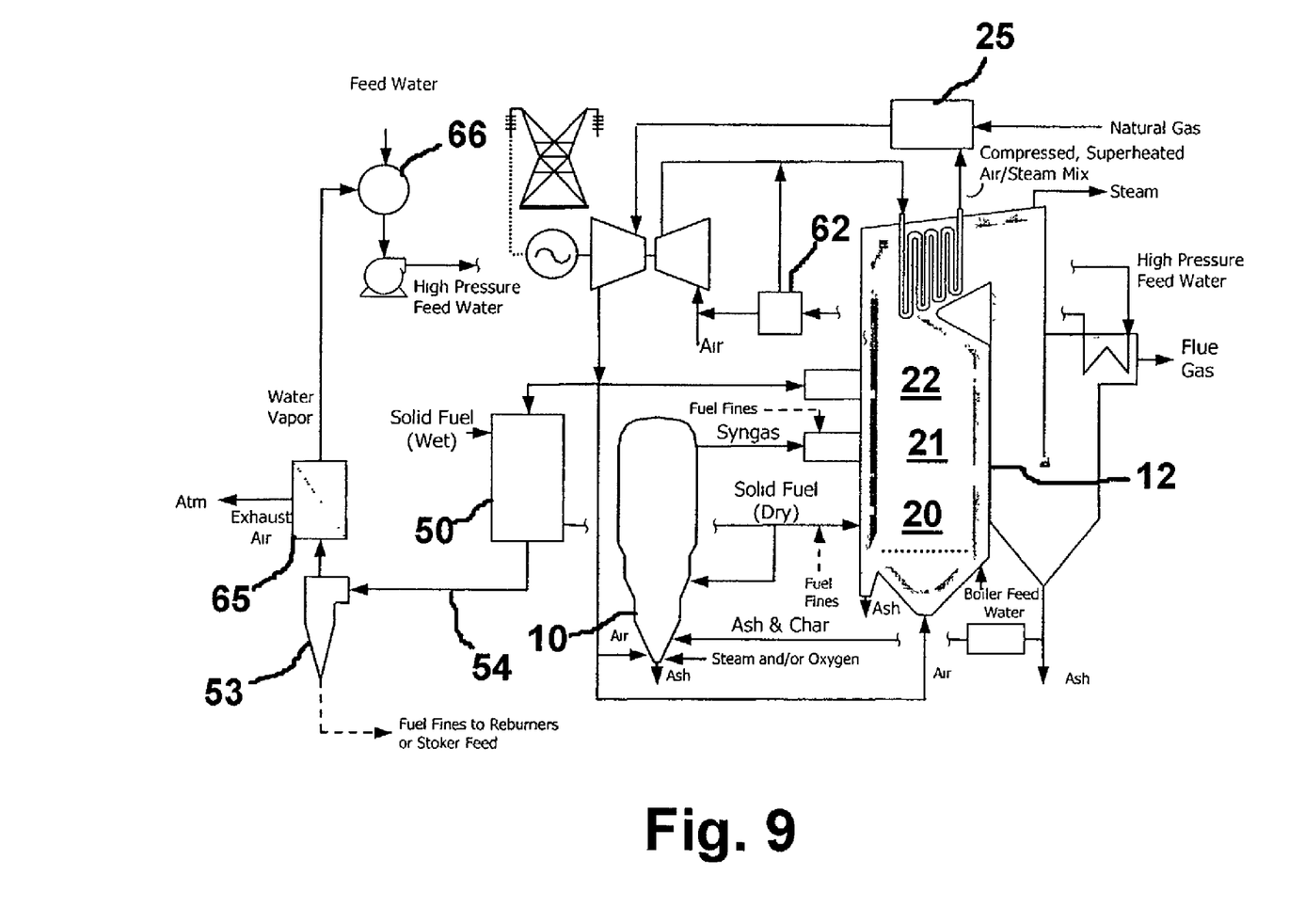
FIG. 9 is a schematic diagram of a gasification-based combined heat and power generation system having a combined air/steam working fluid and water vapor separator system in accordance with one embodiment of this invention.

In accordance with yet another embodiment, as shown in FIG. 9, the apparatus of this invention further comprises water vapor separator 65 and direct spray condenser 66. Water vapor separator 65 is in fluid communication with fuel dryer dust collector 53 and direct spray condenser 66 is in fluid communication with water vapor separator 65, whereby water vapor is separated from the dryer exhaust air from fuel dryer dust collector 53 in water vapor separator 65 and condensed in direct spray condenser 66 for use as boiler feed water. In accordance with one embodiment of this invention, water vapor separator is a membrane separator.

Figure 10:
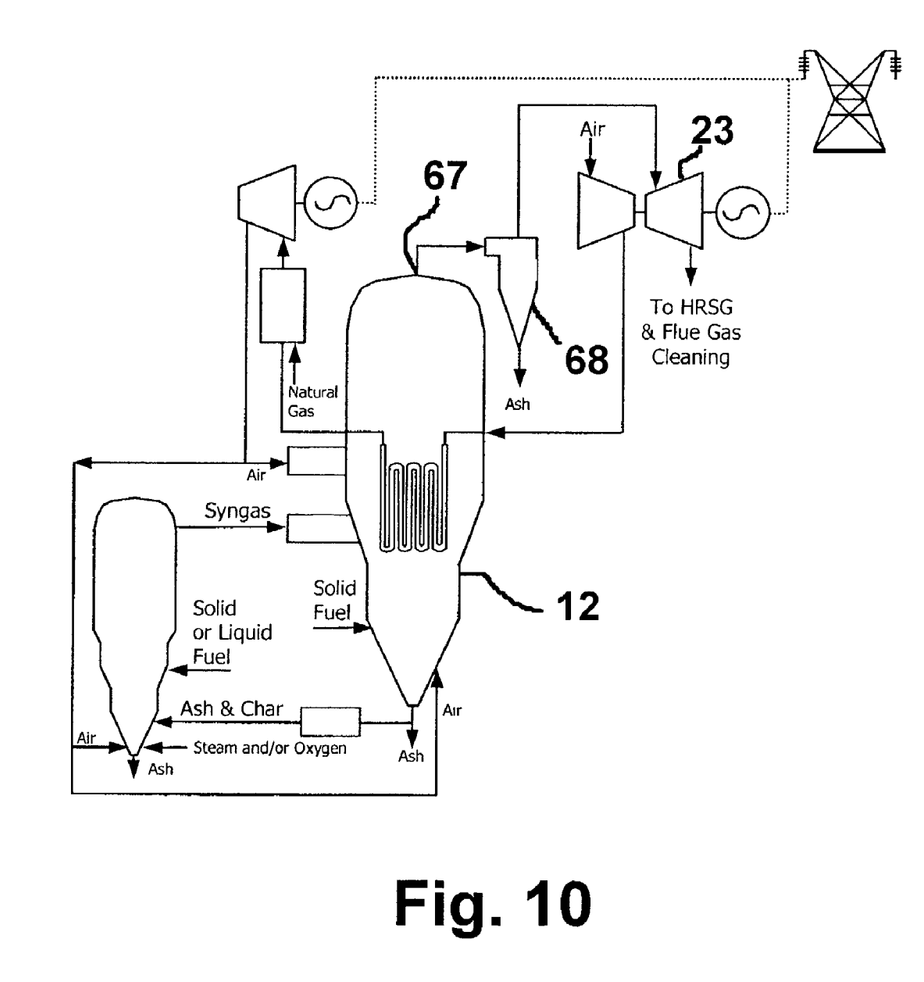
FIG. 10 is a schematic diagram of a gasification-based combined heat and power generation system having a pressurized solids combustor in accordance with one embodiment of this invention.

In accordance with one embodiment of this invention, as shown in FIG. 10, combustor 12 is a pressurized combustor having flue gas or exhaust gas outlet 67 in fluid communication with a pressurized cyclone 68. In accordance with this embodiment, the pressurized hot flue gases from pressurized cyclone 68 are expanded in gas turbine 23, resulting in the generation of electricity.

The method and apparatus of this invention convert solid and liquid fuels to synthesis gas, steam and/or electricity. In accordance with one embodiment of the method of this invention, in a range of about 10% to about 40% of a solid fuel and/or a liquid fuel is introduced into a gasifier and gasified, resulting in formation of a synthesis gas. Gasification of the fuel is preferably carried out at an air/fuel ratio in the range of about 0.25 to about 0.60 and temperatures in the range of about 1200° F. to about 2000° F. The remaining portion, in the range of about 60% to about 90%, of the solid fuel and/or the liquid fuel is introduced into the first stage of a multi-stage combustor, resulting in formation of products of combustion and ash and/or char. In accordance with one preferred embodiment of this invention, the multi-stage combustor comprises three stages. The raw synthesis gas produced in the gasifier is introduced into the second stage of the multi-stage combustor, which second stage is disposed downstream of the first stage, and overfire oxidant, which may be air, oxygen or oxygen-enriched air, is introduced into the third stage of the multi-stage combustor, which third stage is disposed downstream of the second stage. As a result of the introduction of the overfire oxidant, final burnout of both the combustor fuel and the synthesis gas is achieved. The ash and/or char from the combustor is then introduced into the gasifier, providing increased carbon burnout from the combustor ash and/or char stream.

In accordance with one embodiment of this invention, air compressed to a pressure in the range of about 10 to about 30 atmospheres is heated by a portion of the heat in the multi-stage combustor to a temperature in the range of about 1400° F. to about 2000° F. A second portion of the heat in the multi-stage combustor is used to generate steam. In accordance with one embodiment, the temperature of the heated compressed air is increased to a temperature in the range of about 2100° F. to about 2600° F. by direct combustion with a small amount of clean-burning fuel, such as natural gas or oil, under very high excess air conditions. The high pressure, superheated air may then be expanded in a gas turbine to produce electricity.

In accordance with one embodiment of the method of this invention, the expanded air may be utilized as primary combustion air and/or overfire air in the multi-stage combustor, as gasification air in the gasifier, and/or for solid fuel drying and/or steam production in high electricity production cases. In accordance with one embodiment of this invention, a mixture of air and water is heated to produce a mixture of air and steam for expansion in place of the superheated, pressurized air.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A method for conversion of solid and liquid fuels to at least one of a synthesis gas, steam and electricity comprising the steps of:
   gasifying in a range of about 10% to about 40% of at least one of a solid fuel and a liquid fuel in a gasifier, resulting in formation of a synthesis gas;
   introducing a remaining portion of said at least one of said solid fuel and said liquid fuel into a first stage of a multi-stage combustor, resulting in formation of products of combustion and at least one of ash and char;
   introducing said synthesis gas into a second stage of said multi-stage combustor disposed downstream of said first stage;
   introducing overfire oxidant into a third stage of said multi-stage combustor disposed downstream of said second stage; and
   introducing said at least one of said ash and said char into said gasifier.

2. A method in accordance with claim 1 further comprising compressing air to a pressure in a range of about 10 atmospheres to about 30 atmospheres, producing compressed air, transferring a portion of heat generated in said multi-stage combustor to said compressed air resulting in said compressed air having a temperature in a range of about 1200° F. to about 2000° F., and using a portion of said heat to generate steam.

3. A method in accordance with claim 2, wherein said temperature of said compressed air is increased to an elevated temperature in a range of about 2100° F. to about 2600° F. by direct combustion of at least one of a gaseous fuel and a liquid fuel in a turbine combustor.

4. A method in accordance with claim 1, wherein a gasifier pressure in said gasifier is in a range of about 0.05 to about 1.5 atmospheres above an operating pressure of said combustor.

5. A method in accordance with claim 1, wherein said overfire oxidant comprises in a range of about 30% to about 50% by volume of a total amount of oxidant introduced into said multi-stage combustor.

6. A method in accordance with claim 3, wherein said preheated compressed air is expanded in a gas turbine forming expanded air and resulting in generation of electricity.

7. A method in accordance with claim 2, wherein said compressed air is indirectly heated in an air heat exchanger disposed within said multi-stage combustor.

8. A method in accordance with claim 6, wherein said compressed air is produced by a turbine compressor operably connected to said gas turbine.

9. A method in accordance with claim 6, wherein said expanded air is conveyed into at least one of said gasifier and said multi-stage combustor.

10. A method in accordance with claim 6, wherein said expanded air is used to dry said solid fuel prior to introduction of said solid fuel into said multi-stage combustor.

11. A method in accordance with claim 6, wherein said expanded air is used to raise steam in a heat recovery steam generator.

12. A method in accordance with claim 2, wherein said multi-stage combustor is a boiler.

13. A method in accordance with claim 12, wherein boiler feed water is preheated and mixed with said compressed air, forming a feed water/compressed air mixture, said feed water/compressed air mixture is heated in said multi-stage combustor, producing a superheated steam/compressed air mixture, and said superheated steam/compressed air mixture is introduced as a working fluid into a gas turbine.

* * * * *